UNITED STATES PATENT OFFICE 2,638,406

PRODUCTION OF URANIUM TETRAFLUORIDE

Arthur D. Tevebaugh, Ames, Iowa, and Fred Vaslow, Los Alamos, N. Mex., assignors to the United States of America as represented by the United States Atomic Energy Commission No Drawing. Application December 14, 1945, Serial No. 635,104

12 Claims. (Cl. 23—14.5)

The present invention relates to uranium tetrafluoride and is particularly concerned with providing rapid and convenient methods of converting uranium hexafluoride to uranium tetrafluoride.

In the past many attempts have been made to produce uranium tetrafluoride from uranium hexafluoride but none of these attempts have been very successful. For example, it has been suggested that, when uranium hexafluoride is treated with hydrogen, or reacted with sulphur, phosphorus, silicon, arsenic, or carbon, uranium tetrafluoride is produced. It has been found that while some of these reactions may take place at elevated temperatures, the reactions in general are slow and the yields poor, and generally these processes do not produce satisfactory results. For example, it has been reported several times that uranium hexafluoride can be reduced easily with hydrogen, a typical report appearing in Z.anorg.Chem. 72, 82 (1911) where Otto Ruff and A. Henizelmann state that uranium hexafluoride could be easily reduced by hydrogen at room temperature. In order to determine the correctness of this report 220 grams of uranium hexafluoride was condensed in a copper trap at dry ice temperature. The trap was swept out with dry nitrogen and then with hydrogen. Hydrogen was allowed to pass through slowly while the temperature rose to room temperature. There was continual fuming at the exit, but examination of the trap showed that all the uranium hexafluoride had vaporized and no tetrafluoride was visible. The fuming at the exit was due entirely to hydrolysis of the uranium hexafluoride.

A further test of this process at elevated temperatures was then conducted. In this test 100 grams of uranium hexafluoride was placed in a vessel and connected to a nickel plated copper tube in a resistance furnace. Hydrogen was passed through a trap, which was kept at 0° C., and then through the nickel plated tube. The temperature of the tube was then slowly raised from room temperature to about 600° C. At intervals the hydrogen was swept out with nitrogen and the tube opened to observe any deposits. The temperatures of the gases in the tube and the outside surface of the tube were taken. The first formation of tetrafluoride was observed after the inside temperature had reached 390° C. (wall temperature 490° C.). The temperature was raised to 600° C. and the experiment continued. After fuming had ceased the apparatus was dismantled and the contents of the tube removed. There was a thin paper-like scale over the entire inner surface. Near the entrance end the deposit was green. At the exit end the deposit was brown. The major part of the deposit was jet black. Investigation showed that the total yield was only 31 grams of uranium tetrafluoride out of the 100 grams of uranium hexafluoride. Similar experiments were run using chlorine or arsine as catalysts for the reaction, but the results of these tests were equally unsatisfactory.

It has now been discovered that uranium hexafluoride can be reduced to uranium tetrafluoride by the use of hydrogen halides. This provides a rapid and convenient method for producing uranium tetrafluoride from uranium hexafluoride. In addition it was found that extremely good yields could be obtained by this method. In general the method consists of preferably mixing hydrogen bromide or hydrogen iodide, at room temperature, or hydrogen chloride at a temperature of at least about 100° C. and preferably 300° C., with uranium hexafluoride vapor, or passing these hydrogen halides over solid uranium hexafluoride to reduce the uranium hexafluoride to uranium tetrafluoride.

The following are examples of the process of the present invention, it being understood that these examples are given only for purposes of illustration and that it is not intended to limit the invention to the details given in the experiments.

Example 1

Hydrogen bromide was passed over uranium hexafluoride starting at −80° C. and warming. When the reaction vessel reached room temperature bromine gas was observed coming from the exit. The reaction went to completion while the reaction vessel was being heated to 100° C. The product was mostly a green cake in the reaction vessel. It analyzed 76.0% uranium and 23.8% fluorine, the theoretical analysis for $UF_4$ being 75.8% uranium and 24.2% fluorine.

Example 2

In another procedure uranium hexafluoride was heated to the vaporization point in a stream of hydrogen chloride gas, the two gases being swept into a reaction tube at 300° C. The product from the reaction tube was green and analyzed 75.0% uranium and 24.8% fluorine.

It will be apparent to those skilled in the art to which this invention pertains that various modifications may be made without departing from the principles of the invention as disclosed herein, and thus it is not intended that the invention should be limited other than by the scope of the appended claims.

The process of producing uranium tetrafluoride by subjecting uranium hexafluoride to the action of other inorganic halides such as silicon tetrachloride, thionyl chloride and phosphorus trichloride is disclosed and claimed in copending patent application, Serial No. 659,853, of John W. Gates, Jr., and Lawrence J. Andrews and filed on April 5, 1946. The process for the production of uranium tetrafluoride by subjecting uranium hexafluoride to the action of a substantially anhydrous organic fluorine acceptor such as carbon tetrachloride, ethylene dichloride, trichloroethylene and chloroform is disclosed and claimed in copending application, Serial No. 182,134, filed on August 29, 1950, as a continuation-in-part of Serial No. 659,853.

What is claimed is:

1. The process of producing uranium tetrafluoride from uranium hexafluoride which comprises contacting the uranium hexafluoride with a hydrogen halide selected from the group consisting of hydrogen bromide, hydrogen iodide and hydrogen chloride.

2. The process of producing uranium tetrafluoride from uranium hexafluoride which comprises contacting the uranium hexafluoride with hydrogen chloride.

3. The process of producing uranium tetrafluoride from uranium hexafluoride which comprises contacting the uranium hexafluoride with hydrogen bromide.

4. The process of producing uranium tetrafluoride from uranium hexafluoride which comprises contacting the uranium hexafluoride with hydrogen iodide.

5. The process of producing uranium tetrafluoride from uranium hexafluoride which comprises contacting uranium hexafluoride with hydrogen chloride at a temperature above 100° C.

6. The process of producing uranium tetrafluoride from uranium hexafluoride which comprises mixing gaseous uranium hexafluoride with gaseous hydrogen bromide.

7. The process of producing uranium tetrafluoride from uranium hexafluoride which comprises mixing gaseous uranium hexafluoride with gaseous hydrogen iodide.

8. The process of producing uranium tetrafluoride from uranium hexafluoride which comprises mixing gaseous uranium hexafluoride with gaseous hydrogen chloride.

9. The process of producing uranium tetrafluoride from uranium hexafluoride which comprises passing gaseous hydrogen bromide over solid uranium hexafluoride.

10. The process of producing uranium tetrafluoride from uranium hexafluoride which comprises passing gaseous hydrogen iodide over solid uranium hexafluoride.

11. The process of producing uranium tetrafluoride from uranium hexafluoride which comprises passing gaseous hydrogen chloride over solid uranium hexafluoride.

12. The process of producing uranium tetrafluoride from uranium hexafluoride, which comprises contacting the uranium hexafluoride in vapor state with hydrogen chloride in vapor state, and recovering solid uranium tetrafluoride.

ARTHUR D. TEVEBAUGH.
FRED VASLOW.

No references cited.